United States Patent [19]

Rozmus, Jr. et al.

[11] 4,388,088

[45] Jun. 14, 1983

[54] VACUUM CHAMBER ASSEMBLY FOR DEGASSING PARTICULATE MATERIAL

[75] Inventors: Walter J. Rozmus, Jr.; Walter J. Rozmus, both of Traverse City, Mich.

[73] Assignee: Kelsey-Hayes Company, Romulus, Mich.

[21] Appl. No.: 322,022

[22] Filed: Nov. 16, 1981

[51] Int. Cl.³ .......................... B03C 9/00; B65G 69/20

[52] U.S. Cl. .......................................... 55/101; 55/2; 55/356; 55/385 R; 55/410; 55/424; 209/127 C; 209/143; 134/1; 134/21; 141/66

[58] Field of Search ..................... 55/2, 3, 6, 100, 101, 55/136–138, 145, 152, 356, 357, 385 R, 410, 419, 422, 424, 432, 418; 209/1, 3, 9, 127 R, 127 C, 143; 34/92, 102; 134/1, 21, 25.1, 25.4; 141/65, 66

[56] References Cited

U.S. PATENT DOCUMENTS 3,786,130 1/1974 Baker .................................. 141/65

4,056,368 11/1977 Rozmus .................................. 55/2

FOREIGN PATENT DOCUMENTS 56-40424 4/1981 Japan .................................. 55/100

*Primary Examiner*—David L. Lacey

*Attorney, Agent, or Firm*—Harold W. Milton, Jr.

[57] ABSTRACT

A vacuum chamber (10, 10') having first and second ends (28, 28') with a flow passage (30) at each end for directing the flow of particulate material into and out of the vacuum chamber. The vacuum chamber has a vacuum outlet duct (26) midway between the first and second ends (28, 28') thereof for removing gaseous contaminants. A flow control structure (32, 32') is disposed within the vacuum chamber (10, 10') between said first and second ends and has symmetrical ends for receiving particulate material from one of the flow passages (30) and directing the flow of particulate material to the other one of the flow passages while isolating the flow of particulate material from the surrounding space of the vacuum chamber through the central portion of the vacuum chamber adjacent the vacuum outlet duct (26) and for dispersing the particulate material while being subjected to the vacuum chamber adjacent the other one of the flow passages before the particulate material flows out the other one of the flow passages. Additionally, an electric field producing structure (80) may be included for producing an electric field to subject the particulate material to the electric field to electrically charge the gaseous contaminants and cause separation of the contaminants from the particulate material to facilitate removal of gaseous contaminants through the vacuum outlet duct.

16 Claims, 6 Drawing Figures

VACUUM CHAMBER ASSEMBLY FOR DEGASSING PARTICULATE MATERIAL

TECHNICAL FIELD

This invention relates to an assembly for degassing or cleaning particulate material which is at least in part contaminated by gas.

The invention is particularly useful in the field of powder metallurgy, specifically, for preparing metal powders of the superalloy type for consolidation, i.e., densification under heat and pressure. A substantial portion of the powders are produced in an inert atmosphere, for example, argon. However, before the powder is consolidated or densified, it is necessary to remove the inert gas from the powder.

A significant advance in the degasification of powdered metal was made by one of the inventors named herein, Walter J. Rozmus, his invention being described and claimed in U.S. Pat. No. 4,056,368 granted Nov. 1, 1977. In accordance with that invention, degasification is accomplished by introducing gas-contaminated particulate material into a vacuum chamber which is connected to a vacuum pump. One or more electric fields are produced within the vacuum chamber by applying a potential across one or more sets of electrodes. The electrical field charges the gas contaminants and excites them so that the gas contaminants are separated from the particulate material and are more easily removed from the vacuum chamber. Such is accomplished by placing a container filled with gas-contaminated particulate material above the vacuum chamber and connecting the container to the vacuum chamber so that the particulate material may flow downwardly under the force of gravity through the vacuum chamber and into a receiver container, the receiver container being sealed and removed from the apparatus so that the degasified powder therein remains under a vacuum for further processing. Most often one pass of the gas-contaminated particulate powdered metal through the vacuum chamber does not sufficiently degas the powdered metal. In such a case, the containers would have to be disconnected from the vacuum assembly, repositioned, and the entire assembly sequenced to initiate a new operational mode.

In order to solve that problem one of the inventors named herein, Walter J. Rozmus, conceived an invention for degassing particulate material by multiple passes of the material through a vacuum chamber between containers at each end of the vacuum chamber wherein the vacuum chamber and the containers may be cycled or flip flopped back and forth through an arc of 180° to continually pass the gas-contaminated particulate material back and forth through the vacuum chamber until the particulate material has reached the desired level of degasification. That invention is described and claimed in United States application Ser. No. 267,729 filed May 28, 1981 in the name of Walter J. Rozmus and assigned to the assignee of the subject invention, now U.S. Pat. No. 4,348,212.

As part of the development of the concept of the cyclic or flip-flop degasser utilizing a vacuum chamber which may be rotated end-for-end, there developed a need for a vacuum chamber assembly which would most effectively degas the particulate material in multiple passes of the particulate material through the vacuum chamber assembly. The subject invention provides such a vacuum chamber assembly which may be cycled or flip flopped end-for-end to effectively remove gas grom particulate material.

STATEMENT OF INVENTION AND ADVANTAGES

This invention relates to an assembly for degassing gas-contaminated particulate material, including a vacuum chamber having first and second ends with a flow passage at each end for directing the flow of particulate material into and out of the vacuum chamber and with a vacuum outlet midway between the ends of the vacuum chamber for removing gaseous contaminates. The invention is characterized by a flow control means disposed within the vacuum chamber and having symmetrical ends for receiving particulate material from either of the flow passages and directing the flow of particulate material to the opposite end while isolating the flow of particulate material from the surrounding vacuum chamber through the central portion of the vacuum chamber adjacent the vacuum outlet and for dispersing the particulate material while being subjected to the vacuum chamber adjacent the opposite or outlet and before the particulate material flows out of the adjacent flow passage whereby a quantity of particulate material may flow by gravity through the vacuum chamber from the first end to the second end and, thereafter, the vacuum chamber may be turned end-for-end so that the quantity of particulate material may flow by gravity back through the vacuum chamber from the second end to the first end thereof.

FIGURES OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
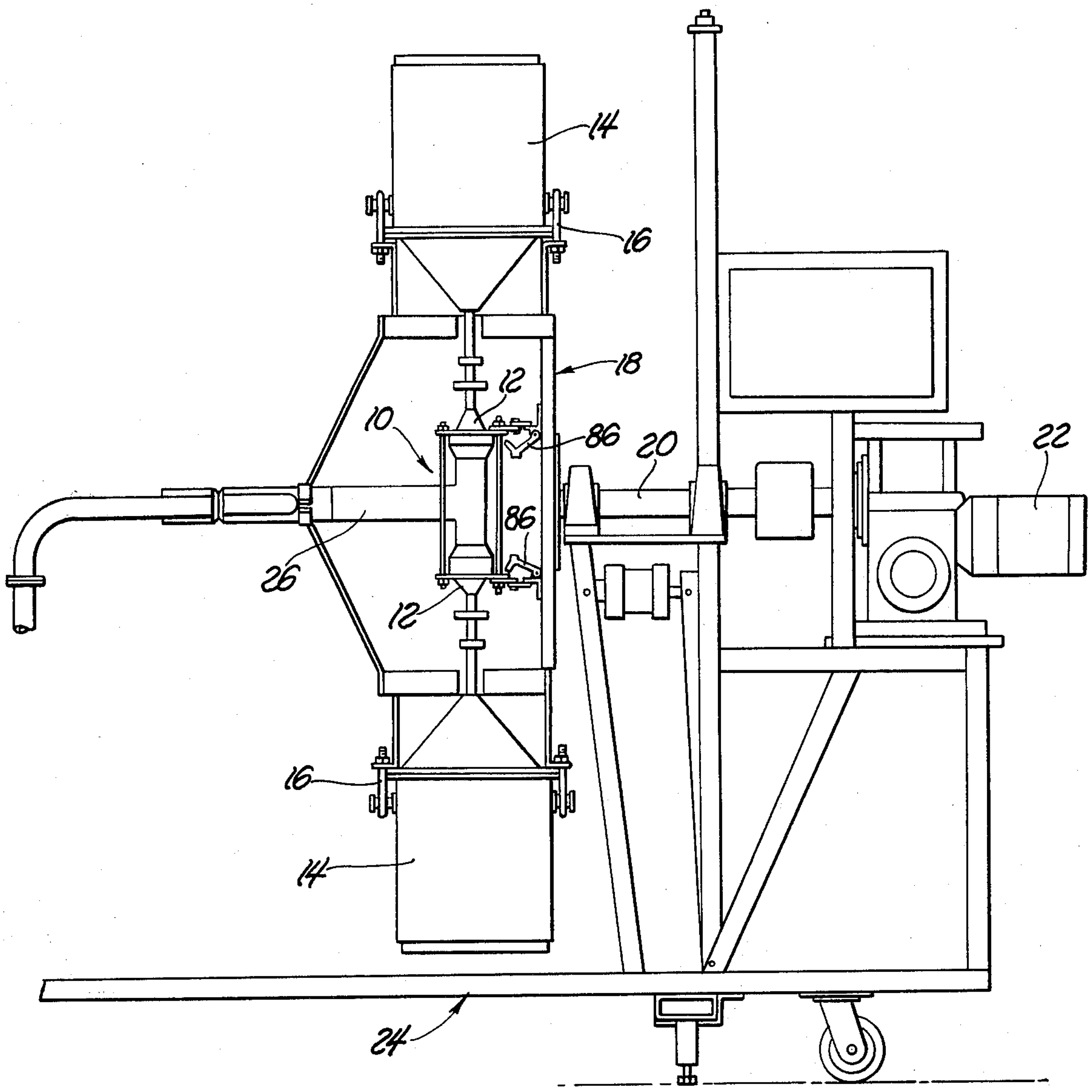
FIG. 1 is a side-elevational view of an assembly utilizing the subject invention.

FIG. 1 discloses an assembly of the type more specifically described and claimed in the above-mentioned application Ser. No. 267,729 filed May 28, 1981. Broadly the assembly shown in FIG. 1 includes a vacuum chamber assembly generally indicated at 10 constructed in accordance with the subject invention. The assembly 10 includes flow passages 12 at the respective ends thereof which are, in turn, connected to the containers 14. The containers 14 are identical and are connected by the assembly 16 to a framework generally indicated at 18 which may be flip flopped or rotated back and forth through 180° by a shaft 20 driven by a motor 22, all of which are supported by a structure generally indicated at 24. The vacuum chamber assembly 10 has a horizontal vacuum outlet 26.

Figure 2:
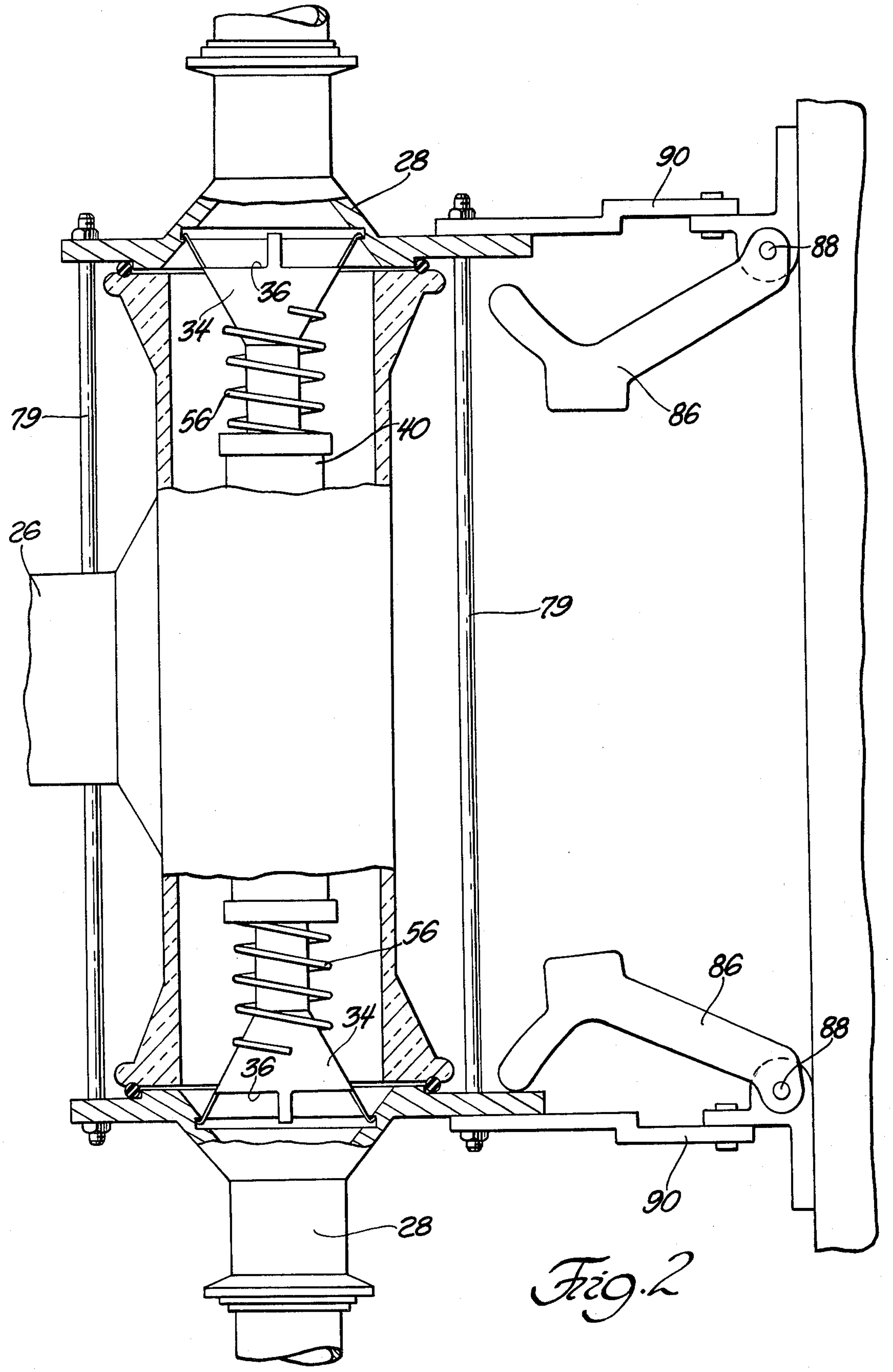
FIG. 2 is a side-elevational view partially broken away and in cross section of a first embodiment of the subject invention.
Figure 3:
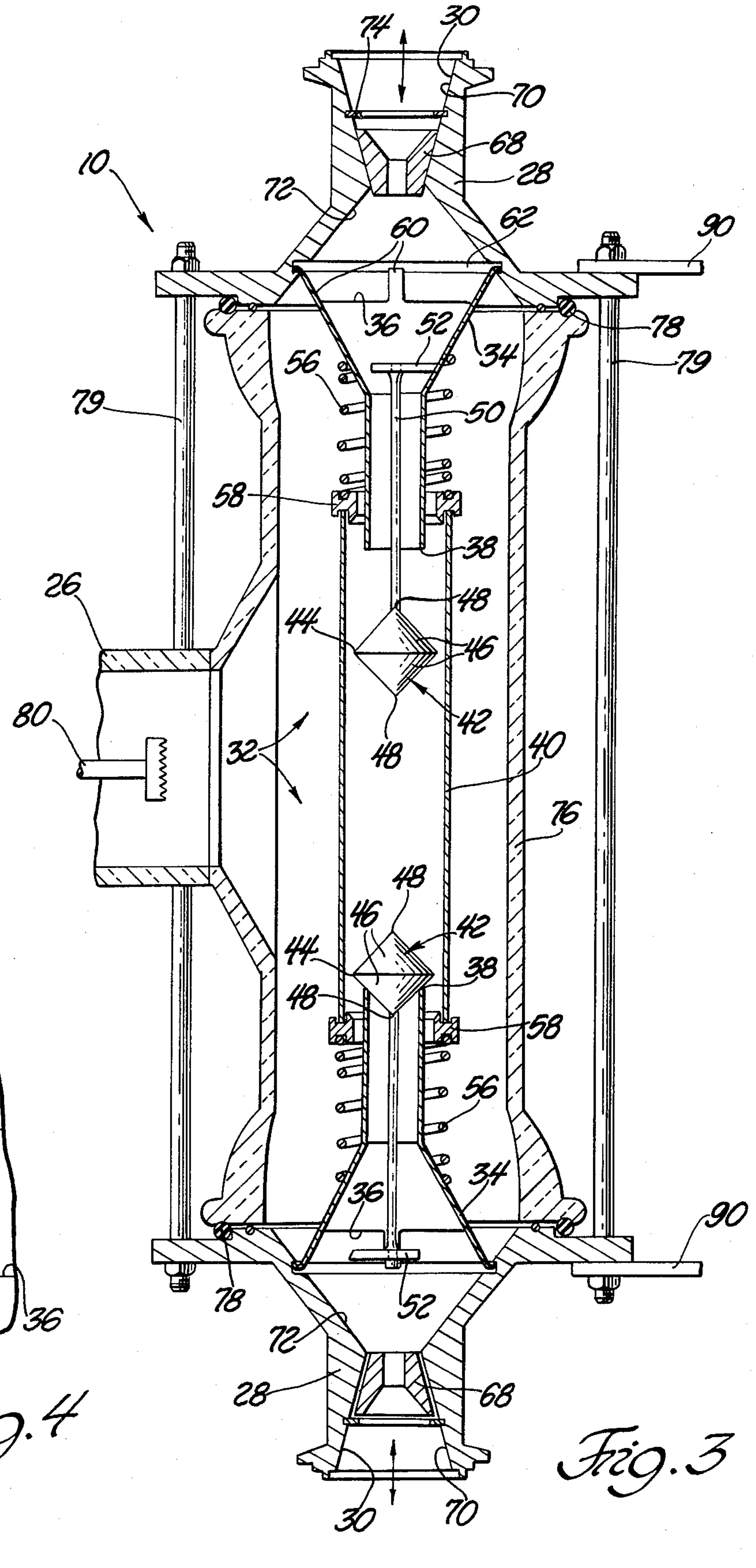
FIG. 3 is a vertical cross-sectional view of the embodiment of FIG. 2.
Figure 5:
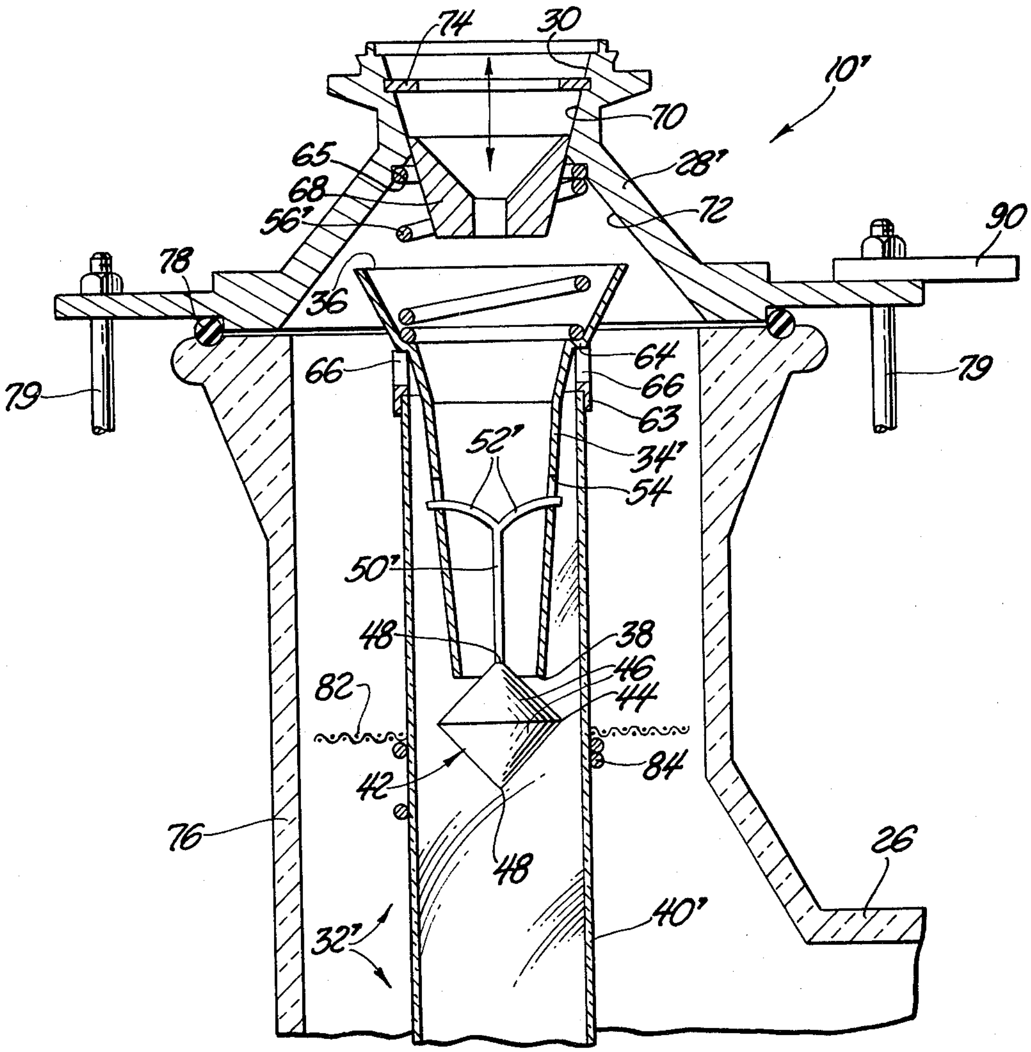
FIG. 5 is a fragmentary vertical cross-sectional view of the upper half of a second embodiment of the subject invention.

Two embodiments exemplify the subject invention, the embodiments of FIGS. 2 and 3 and the embodiment of FIG. 5. Both embodiments will be described simultaneously with like components having like reference numerals and with equivalent components being designated in the embodiment of FIG. 5 by the same numeral but with a prime.

An assembly for degassing gas-contaminated particulate material constructed in accordance with the subject invention includes a vacuum chamber generally shown at 10 and 10′. The vacuum chamber assembly has first and second ends defined by the metal end caps 28 and 28′. The end caps include flow passages indicated by the arrows 30 for directing the flow of particulate material into and out of the vacuum chambers 10 and 10′. The flow passages surrounding the arrows 30 will be hereinafter referred to by the numeral 30. Each of the vacuum chambers has a vacuum outlet duct 26 midway between the ends or the end caps 28 and 28′ for removing gaseous contaminants from the interior of the vacuum chambers.

The vacuum chamber assemblies 10 and 10′ are characterized by the flow control means generally shown at 32 and 32′ respectively, each of which have symmetrical ends for receiving particulate material from either of the flow passages 30 at either end and directing the flow of particulate material to the opposite end while isolating the flow of particulate material from the surrounding vacuum chamber through the central portion of the vacuum chamber adjacent the vacuum outlet duct 26 and for dispersing the particulate material while being subjected to the vacuum chamber adjacent the opposite end before the particulate material flows out the adjacent flow passage 30. In this manner, a quantity of particulate material may flow under the force of gravity through the vacuum chamber from the first or top end to the bottom or second end and thereafter the vacuum chamber may be turned or rotated end-for-end so that the quantity of particulate material may flow by gravity back through the vacuum chamber from the second end which is now at the top to the first end which is now at the bottom. In other words, the particulate material may flow back and forth between the containers 14 illustrated in FIG. 1 as the top container 14 empties into the bottom container 14 and thereafter the bottom-filled container 14 is moved to the top position to empty into the lower container 14.

More specifically, the flow control means 32 and 32′ include funnel-shaped members 34 and 34′ disposed adjacent each of the flow passages 30 at the respective ends of the vacuum chamber. Each of the funnel-shaped members 34 and 34′ has a large inlet opening 36 with a periphery thereof facing the adjacent flow passage 30 and a small outlet opening 38 spaced from and facing the small outlet opening 38 of the opposite or other funnel-shaped member. At least a portion of the periphery of the inlet opening 36 of each funnel-shaped member is spaced from the adjacent flow passage 30 for allowing particulate material dispersed over the exterior of each funnel-shaped member to flow out the adjacent flow passage 30.

The flow control means 32 and 32′ also includes the tubular member 40 which 40′ is suspended in the vacuum chamber assemblies 10 and 10′ with the ends thereof disposed in spaced relationship to the small outlet openings 38 for isolating the flow of particulate material from the central portion of the vacuum chamber. The ends of the tubular members 40 and 40′ are spaced from the large inlet openings 36 in the vertical direction to expose outwardly flared portions of the funnel members 34 and 34′ openly to the interior of the vacuum chamber.

Also, included are dispersal means comprising the dispersal members generally indicated at 42 for dispersing the particulate material exiting from the upper small outlet opening 38 to the exterior of the opposite or bottom small outlet opening 38 and over the exterior of the exposed portion of the opposite funnel-shaped member 34 and 34′ so that the particulate material flows over the periphery of the large inlet opening 36 of the bottom funnel-shaped members and out the adjacent flow passage 30. Each of the dispersal members 42 has a high point surrounded by a downwardly and outwardly sloping surface for engaging and dividing the flow of particulate material from one or the upper small outlet opening 38 into a curtain surrounding the opposite or lower small outlet opening 38. More specifically, a dispersal member 42 is associated with each small outlet opening 38 and each dispersal member 42 has a circular outer periphery 44 which is larger than the circular small outlet openings 38 with conical surfaces 46 extending in opposite directions from the periphery 44 to oppositely pointing apexes 48.

Figure 6:
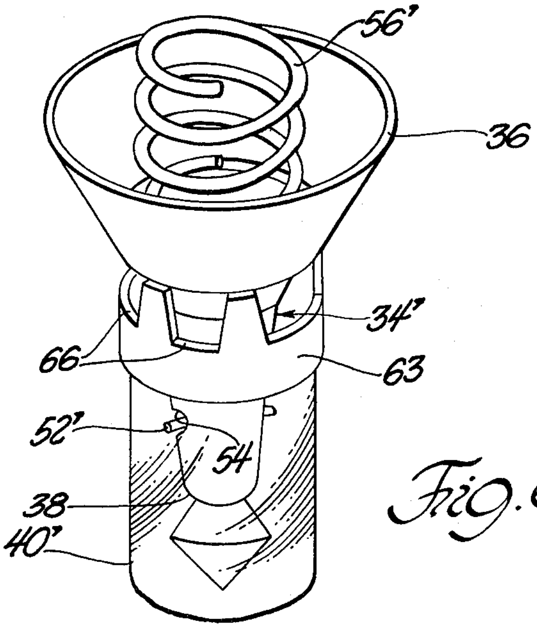
FIG. 6 is a fragmentary perspective view of part of the assembly of the embodiment of FIG. 5.

The dispersal means also includes retaining means defined by the stems 50 and 50′ and the arms 52 and 52′ for allowing each dispersal member 42 to move between a closed position closing the associated small outlet opening 38, as shown at the bottom of FIG. 3, and an open position spaced from the associated small outlet opening 38, as shown at the top of FIG. 3 and in FIGS. 5 and 6. In the embodiment of FIGS. 2 and 3, the stems 50 extend from one apex of each dispersal member 42 and into the associated small outlet opening 38 to the radially extending arms 52 which engage the interior surface of the associated funnel-shaped member 34 to position the upper dispersal member 42 in the open position. In other words, the arms 52 extend radially (preferably three in number and 120° apart) and move under the force of gravity between the open and closed positions respectively illustrated at the top and bottom of FIG. 3. In the embodiment of FIG. 5, the arms 52′ (preferably two in number) extend through slots or openings 54 in the funnel-shaped members 34′ to be guided thereby in vertical movement.

Figure 4:
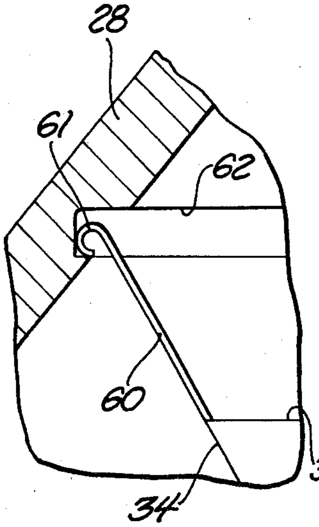
FIG. 4 is an enlarged fragmentary view showing the connection between two components in the embodiment of FIG. 3.

Coil springs 56 and 56′ are disposed at ends of the tubular members 40 and 40′, respectively, for suspending the tubular members within the vacuum chamber. In the embodiment of FIGS. 2 and 3, the coil springs 56 have one end engaging the outwardly flaring portion of the adjacent or associated funnel-shaped member 34 and the other end engaging the adjacent end of the tubular member 40 through adapters 58. The tubular member 40 is circular, as are the adapters 58 which define the ends of tubular member 40, with the interior of the adapters 58 being in radially spaced relationship to the exterior small portion of the adjacent funnel-shaped member 34 to allow the flow of particulate material about the exterior of the funnel-shaped member to be dispersed over the outward flared portion at the bottom thereof and over the periphery 36 and out the bottom flow passage 30. Each of the funnel-shaped members 34 has a plurality of arms 60 extending outwardly and upwardly from the periphery of the large inlet opening 36 thereof to be supported within the adjacent flow passage 30 for positioning the funnel-shaped members 34. Specifically, the upper ends of the arms 60 are curved as illustrated at 61 in FIG. 4 and are snapped into a groove 62 in the cap members 28. In the embodiment of FIG. 5, the coil springs 56' each have one end engaging the interior of the outwardly flared portion of the adjacent funnel-shaped member 34' with the other end engaging the adjacent end of the vacuum chamber as defined by the end cap 28'. There is also included a positioning member 63 interconnecting each end of the tubular member 40' and the exterior of the adjacent funnel-shaped member 34'. Specifically, each funnel-shaped member 34' has a radially extending flange 64 defining an interior shoulder and an exterior shoulder. The end of the spring 56' engages the interior shoulder defined by the flange 64 while the opposite end of the coil spring 56' is disposed in an annular recess 65 in the end cap member 28'. One positioning member 63 is disposed at each end of the tubular member 40' and has radially extending openings 66 to allow the particulate material to flow about the exterior of the funnel-shaped member 34' and out of the end of the tubular member and over the exterior outwardly flared portion of the adjacent funnel-shaped member 34'.

There is also included a valve means defined by the valve members 68 in each of the flow passages 30 for limiting the flow rate of material into the vacuum chambers to a predetermined inlet flow rate while allowing the outlet flow rate of particulate material out of the vacuum chamber at the bottom thereof to be greater than the predetermined inlet flow rate. More specifically, each of the flow passages 30 includes an inlet portion 70 of decreasing cross section in the direction of flow of particulate material into the vacuum chamber, i.e., each portion 70 is conical with a decreasing diameter in the direction into the vacuum chamber. The inlet portion 70 terminates at a throat in the cap members 28 and 28' wherein the remainder of the flow passages 30 in the cap members is defined by conical outlet portions 72 which are of decreasing cross-sectional area or diameter in the direction of flow out of the vacuum chamber. Again, the periphery at the large openings 36 in the funnel members are spaced from the outlet portions 72. A groove is disposed in each of the inlet portions 70 and a stop member defined by a snap ring 74 is disposed therein. As the inlet portions 70 are conical, the exterior of each valve member 68 has the same conical slope as the associated inlet portions 70. Thus, each valve member 68 disposed downstream in the inlet flow from the associated stop member 74 and has an exterior surface for sealing engagement with the inlet portion 70 when in the closed position illustrated at the top of FIG. 3 and in FIG. 5. Each valve member 68 has a central inlet having a conical or inwardly tapered inlet extending to a cylindrical outlet, the cylindrical outlet establishing the predetermined inlet flow rate when the upper valve member 68 is in sealing engagement with the inlet portion 70 of the flow passage 30. When at the bottom, the valve members 68 move out of engagement with the inlet portions 70 under the force of gravity to a position against the adjacent stop member 74 to establish the outlet flow rate about the exterior surface of the valve member 68 as well as through the central inlet thereof, which position is illustrated at the bottom of FIG. 3. In other words, when the valve members are at the bottom and in the position illustrated at the bottom of FIG. 3, there is greater passage area for particulate material to flow out of the vacuum chamber than when the valve members are positioned at the top of the assembly.

The vacuum chamber is defined by the metal end caps 28 and 28' in sealing engagement with opposite ends of an electrically nonconductive tube 76. Preferably, the tube 76 is made of glass and is integral with the vacuum outlet 26 and the end caps 28 and 28' are electrically conductive and in sealing engagement with the tubes 76 through seals 78. The end caps 28 and 28' are maintained in sealing engagement with the ends of the tube 76 by tie rods 79 interconnecting the caps at the opposite ends of the tube 76. The funnel-shaped members 34 and 34' and the springs 56 and 56' as well as the dispersal members 42 may be made of metal; however, the tubular members 40 and 40' are preferably made of an electrically nonconductive material such as glass. The assembly also includes an electric field-producing means which includes the electrode 80 disposed within the vacuum outlet duct 26 for producing an electric field to subject the gas-contaminated particulate material to the electric field to electrically charge the gaseous contaminants and cause separation of the gaseous contaminants from the particulate material to facilitate removal of the gaseous contaminants from the vacuum chamber through the vacuum outlet duct 26. The electric field-producing means either positively or negatively charges or ionizes the gases to facilitate their separation from the particulate material and be moved under the force of the vacuum out the vacuum outlet duct 26. A type of electric field-producing means which may be utilized in the outlet 26 is more specifically described and claimed in the application Ser. No. 322,025 filed Nov. 16, 1981, in the name of Walter J. Rozmus and assigned to the assignee of the subject invention, and the disclosure of which is incorporated herein.

Although only illustrated in the embodiment of FIG. 5, both embodiments may include an electrically conductive metal screen 82 disposed about the tubular members 40 and 40' adjacent each end thereof for limiting the movement of particulate material exiting from the bottom of the tubular members 40 and 40' toward the vacuum outlet duct 26. The screens 82 are held in place by spring-like coils 84 frictionally engaging the exterior of the tubular members. The outer circular periphery of the screens 82 are spaced slightly from the interior walls of the tubes 76.

As best illustrated in FIG. 2, there is also included neutralizing means for alternately neutralizing the charge on the end caps 28 and 28'. More specifically, the neutralizing means grounds the bottom end cap through which particulate material is flowing out of the vacuum chamber. The neutralizing means is exemplied by gravity actuated contact arms 86 which are pivotally connected at 88 to the framework 18. The tie rods 79 are made of an electrically nonconductive material or are electrically isolated from the end caps 28 and 28'. Further, the connections between the end caps 28 and 28' and the respective containers 14 would be through, at least in part, an electrically nonconductive conduit such as a plastic pipe. The assemblies 10 and 10' are supported by the framework 18 through brackets 90 which are made of electrically nonconductive material. Thus, as shown in FIG. 2, under the force of gravity the uppermost member 86 is out of contact with the uppermost end cap 28 or 28' whereas the bottom member 86 is in contact with the bottom cap member 28 or 28'.

OPERATION

As alluded to previously, the containers 14 may be attached to the rotating framework 18 by the assembly 16 and connected through appropriate tubing to the opposite ends of the vacuum chamber assembly 10 or 10'. Initially, the full container 14 may be disposed at the bottom with an empty container 14 on top. This may be for rough degassing wherein, while the full container is positioned at the bottom, it would be slowly subjected to the vacuum from the vacuum source through the vacuum outlet duct 26 to remove easily withdrawn gas from the container. The lowermost valve member 68 would be in a more open position to thus facilitate this rough degassing by providing a larger opening. By providing a larger opening in the down position, the valve members 68 also prevent the possible accumulation of powder in the tapered outlet portion 72 of the bottom outlet flow passage 30.

After rough degassing, the framework 18 is rotated 180° to move full container 14 to the top positon so that the flow of particulate material therefrom enters the inlet portion 70 of the top end cap member 28 and through the valve member 68 which controls the volume or rate of particulate material flow into the vacuum chamber. The central opening in the valve members 68 in the upper position is positioned directly above the central portion of the uppermost funnel-shaped member 34 and 34'. The falling particulate material falls about the arms 52 and 52' and down into the narrow or restricted portion of the funnel-shaped members 34 and 34' and out the small outlet openings 38 thereof. The falling particulate material then engages the upper conical surface 46 of the adjacent dispersal member 42 to flow outwardly and form an annular curtain having a diameter greater than the diameter of the outlet opening 38 of the lower funnel-shaped member 34 or 34'. While falling, the particulate material is isolated from the surrounding vacuum chamber by the tubular member 40, thus preventing any of the falling particulate material from moving into the vacuum outlet duct 26. Some of the falling particulate material may engage the uppermost conical surface 46 of the lower disposed dispersal member 42 to flow outwardly into an annular curtain about the exterior of the lower or small end of the lower disposed funnel-shaped member 34 or 34'. The particulate material flows out the lower end of the tubular members 40 and 40' to engage the exterior outwardly flaring portion of the bottom funnel-shaped members 34 and 34'. At this point, the powder is being dispersed or moved into a wider path of area because of the outwardly flared exterior surface of the bottom disposed funnel-shaped members and is exposed to the vacuum chamber. The electrode or electric field-producing means 80 produces a charge, either positive or negative, i.e., a potential between the elctrode 80 and the bottom end of the vacuum chamber. It is preferable that the greatest potential be between the electrode 80 and the bottom of the vacuum chamber where the particulate material is being dispersed than the potential between the electrode 80 and the upper portion of the vacuum chamber. Accordingly, since ground is neutral with respect to either a positive or negative charge, the lowermost electrically conductive end cap 28 or 28' is grounded by the lowermost member 86 thereby establishing a greater potential between the electrode 80 and the lowermost end cap 28 than between the electrode 80 and the uppermost end cap 28 or 28'. Because of the distance between the electrode 80 and the dispersal of the powdered metal at the lower end of the vacuum chamber, the attraction of the powdered metal itself into the vacuum outlet duct 26 is minimized. Further, the screen 82 which would be disposed just below and just above the vacuum outlet duct 26 would become an extension of the electrode 80 in that it would be charged with the same charge, i.e., either negative or positive depending upon the charge of electrode 80, and will be thus charged through the ionized gas particles. The screens 82 would prevent or greatly minimize the movement of any small particles of particulate material from the bottom of the vacuum chamber up and into the vacuum outlet duct 26.

After the upper container 14 has been emptied, the apparatus is actuated to move the lower container 14, which is full of powder, to the top position to allow it to empty into the then lower empty container conducting further degassing of the particulate material. The material may be passed back and forth through the vacuum chamber until the required degree of degassing has been accomplished. Once this is accomplished, the container containing the degassed powder is removed from the apparatus while maintaining a vacuum in the container for further processing.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. An assembly for degassing gas-contaminated particulate material comprising a vacuum chamber (10, 10') having first and second ends (28, 28') with a flow passage (30) at each end for directing the flow of particulate material into and out of said vacuum chamber, said vacuum chamber having a vacuum outlet duct (26) midway between said first and second ends (28, 28') thereof for removing gaseous contaminants from said vacuum chamber, flow control means (32, 32') disposed within said vacuum chamber (10, 10') between said first and second ends and having symmetrical ends for receiving particulate material from one of said flow passages (30) and directing the flow of particulate material to the other one of said flow passages while isolating the flow of particulate material from the surrounding space of said vacuum chamber through the central portion of the vacuum chamber adjacent said vacuum outlet duct (26) and for dispersing the particulate material while being subjected to the vacuum in the vacuum chamber adjacent said other one of said flow passages before the particulate material flows out said other one of said flow passages whereby a quantity of particulate material may flow by gravity through said vacuum chamber from the first end to the second end and thereafter said vacuum chamber may be turned end-for-end so that the quantity of particulate material may flow by gravity, in the same manner back through said vacuum chamber from said second end to said first end thereof.

2. An assembly as set forth in claim 1 wherein said flow control means (32, 32') includes a funnel-shaped member (34, 34') disposed adjacent each of said flow passages (30) at said first and second ends (28, 28') respectively, each of said funnel-shaped members (34, 34') having a large inlet opening (36) with the periphery thereof facing the adjacent flow passage (30) and a small outlet opening (38) spaced from and facing the small outlet opening (38) of the other funnel-shaped member, at least a portion of said periphery of said inlet opening (36) of each of said funnel-shaped members being spaced from said adjacent flow passage (30) for allowing particulate material dispersed over the exterior of each funnel-shaped member (34, 34') to flow out the adjacet flow passage (30), a tubular member (40, 40') suspended in said vacuum chamber with the ends thereof disposed in spaced relationship to said small outlet openings (38) for isolating the flow of particulate material from the central portion of said vacuum chamber, said ends of said tubular member being spaced from said large inlet openings of said funnel-shaped members to expose a portion of each funnel-shaped member to said vacuum chamber, and dispersal means (42) for dispersing the particulate material exiting from one small outlet opening (38) to the exterior of the opposite small outlet opening (38) and over the exterior of the exposed portion of the opposite funnel-shaped member (34, 34') so that the particulate material flows over said periphery of said large inlet opening (36) and out the adjacent flow passage (30).

3. An assembly as set forth in claim 2 wherein said dispersal means (42) includes at least one dispersal member having a high point (48) surrounded by a downwardly and outwardly sloping surface (46) for engaging and dividing the flow of particulate material from one of said small outlet openings (38) into a curtain surrounding the opposite small outlet opening (38).

4. An assembly as set forth in claim 2 wherein said dispersal means (42) includes a dispersal member positioned and arranged with respect to each of said small outlet openings (38), each of said dispersal members having a circular outer periphery (44) larger than said small outlet opening (38) with conical surfaces (46) extending in opposite directions from said periphery to oppositely pointing apexes (48), and retaining means (50, 52, 50', 52') for allowing each dispersal member to move between a closed position closing the associated small outlet opening (38) and an open position spaced from the associated small outlet opening (38).

5. An assembly as set forth in claim 4 wherein said retaining means includes a stem (50, 50') extending from one apex (48) of each dispersal member and into said associated small outlet opening (38) and connected to radially extending arms (52, 52') for engaging said funnel-shaped member (34, 34') to position the dispersal member in said open position.

6. An assembly as set forth in claim 2 including a spring (56, 56') disposed at each end of said tubular member (40, 40') for suspending said tubular member (40, 40') within said vacuum chamber.

7. An assembly as set forth in claim 6 wherein each spring (56) is a coil spring having one end engaging the exterior of the adjacent funnel-shaped member (34) and the other end engaging the adjacent end of said tubular member (40), each of said funnel-shaped members (34) having arms (60) extending from said periphery of said inlet opening (36) thereof and supported within said adjacent flow passage (30) for positioning said funnel-shaped members (34).

8. An assembly as set forth in claim 6 wherein each spring (56') is a coil spring having one end engaging the interior of the adjacent funnel-shaped member (34') and the other end engaging the adjacent end (65) of said vacuum chamber, and a positioning member (63) interconnecting each end of said tubular member (40') and the exterior of the adjacent funnel-shaped member (34').

9. An assembly as set forth in claim 8 wherein each funnel-shaped member (34') has a radially extending flange (64) defining an interior shoulder and an exterior shoulder, said spring (56') engaging said interior shoulder, said positioning member (63) engaging said exterior shoulder, said positioning member (63) having radial openings (66) to allow particulate material to flow out of said tubular member (40') and over the exterior of the adjacent funnel-shaped member (34').

10. An assembly as set forth in claim 2 further including a valve means (68) in each of said flow passages (30) for limiting the flow rate of particulate material into said vacuum chamber to a predetermined inlet flow rate while allowing an outlet flow rate of particulate material out of said vacuum chamber greater than said predetermined inlet flow rate.

11. An assembly as set forth in claim 10 wherein each of said flow passages (30) includes an inlet portion (70) of decreasing cross section in the direction of flow of particulate material into said vacuum chamber, a stop member (74) disposed in each of said inlet portions (70), each of said valve means including a valve member disposed between said stop member and said vacuum chamber and having an exterior surface for sealing engagement with said inlet portion (70) and a central inlet for establishing said predetermined inlet flow rate and for moving out of engagement with said inlet portion and against said adjacent stop member (74) to establish said outlet flow rate about the exterior surface and out through said central inlet.

12. An assembly as set forth in claim 11 wherein each of said inlet portions (70) is conically shaped with the exterior of each valve member having the same conical shape as said inlet portions, said central inlet opening in each valve member having a conical inlet extending to a cylindrical outlet, said stop member (74) being a ring disposed in a groove in said inlet portion.

13. An assembly as set forth in claim 2 wherein said vacuum chamber includes an electrically nonconductive tube (76) and an electrically conductive end cap (28, 28') in sealing engagement with each end of said tube (76), said caps (28, 28') including said flow passages (30), said tubular member (40, 40') being of an electrically nonconductive material, electric field producing means (80) for producing an electric field to subject the gas-contaminated particulate material to the electric field to electrically charge the gaseous contaminants and cause separation of the gaseous contaminants from the particulate material to facilitate removal of gaseous contaminants from said vacuum chamber through said vacuum outlet, and neutralizing means (86) for alternately neutralizing the charge on said end caps.

14. An assembly as set forth in claims 13 wherein said electric field producing means (80) is positioned in said vacuum outlet duct (26) and said neutralizing means (86) grounds the end cap through which particulate material is flowing out of said vacuum chamber.

15. An assembly as set forth in claim 14 further including an electrically conductive screen (82) disposed about said tubular member (40, 40') adjacent each end thereof for limiting the movement of particulate material exiting said tubular member (40, 40') toward said vacuum outlet duct (26).

16. An assembly as set forth in claim 2 wherein said dispersal means includes at least one dispersal member (42) having a high point (48) surrounded by a downwardly and outwardly sloping surface (46) for engaging and dividing the flow of particulate material from one small outlet opening (38) into a curtain surrounding the opposite small outlet opening (38), a spring (56, 56') disposed at each end of said tubular member (40, 40') for suspending said tubular member (40, 40') within said vacuum chamber, a valve means (68) in each of said flow passages (30) for limiting the flow rate of particulate material into said vacuum chamber to a predetermined inlet flow rate while allowing an outlet flow rate of particulate material out of said vacuum chamber greater than said predetermined inlet flow rate, said vacuum chamber including an electrically nonconductive tube (76) and an electrically conductive end cap (28, 28') in sealing engagement with each end of said tube (76) said caps (28, 28') including said flow passages, said tubular member (40, 40') being of an electrically nonconductive material, electric field producing means (80) for producing an electric field to subject the gas-contaminated particulate material to the electric field to electrically charge the gaseous contaminants and cause separation of the gaseous contaminants from the particulate material to facilitate removal of gaseous contaminants from said vacuum chamber through said vacuum outlet duct (26), and neutralizing means (86) for alternately neutralizing the charge on said end caps.

* * * * *